US012165272B2

(12) United States Patent
Onuma

(10) Patent No.: US 12,165,272 B2

(45) Date of Patent: Dec. 10, 2024

(54) IMAGE PROCESSING APPARATUS, IMAGE PROCESSING METHOD, AND STORAGE MEDIUM FOR GENERATING COMPOSITE IMAGE USING 2D IMAGE AND 3DCG

(71) Applicant: CANON KABUSHIKI KAISHA, Tokyo (JP)

(72) Inventor: Kazufumi Onuma, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 235 days.

(21) Appl. No.: 17/886,626

(22) Filed: Aug. 12, 2022

(65) Prior Publication Data

US 2023/0062973 A1 Mar. 2, 2023

(30) Foreign Application Priority Data

Aug. 30, 2021 (JP) ................................. 2021-139991

(51) Int. Cl.

*G06T 19/20* (2011.01)
*G06T 5/50* (2006.01)
*G06T 7/194* (2017.01)

(52) U.S. Cl.

CPC ................ *G06T 19/20* (2013.01); *G06T 5/50* (2013.01); *G06T 7/194* (2017.01); *G06T 2219/2004* (2013.01)

(58) Field of Classification Search

None

See application file for complete search history.

(56) References Cited

U.S. PATENT DOCUMENTS 5,563,988 A * 10/1996 Maes ...................... G06T 17/00 348/E7.083
5,696,892 A * 12/1997 Redmann ................ G06T 13/20 348/E5.022

(Continued)

FOREIGN PATENT DOCUMENTS

JP H11-144077 A 5/1999
JP 2009-141570 A 6/2009

(Continued)

OTHER PUBLICATIONS

Notice of Reasons for Refusal issued by the Japanese Patent Office on Sep. 5, 2023 in corresponding JP Patent Application No. 2021-139991, with English translation.

(Continued)

*Primary Examiner* — Jason A Pringle-Parker

(74) *Attorney, Agent, or Firm* — Carter, DeLuca & Farrell LLP

(57) ABSTRACT

To make it possible to obtain a natural image in which a foreground object included in a two-dimensional image and a background object included in a three-dimensional computer graphics space are in harmony with each other. A two-dimensional image, corresponding to a specific viewpoint, including a foreground object, a parameter specifying a condition at the time of obtaining the two-dimensional image, and position and shape data representing a three-dimensional position and a shape of the foreground object included in the two-dimensional image are obtained. Then, an image including the foreground object and a background object is generated by arranging a screen based on the position and shape data in a computer graphics space including the background object and projecting the image of the foreground object included in the two-dimensional image.

18 Claims, 13 Drawing Sheets

(56) References Cited

U.S. PATENT DOCUMENTS

| | | | | |
|---|---|---|---|---|
| 6,335,765 | B1* | 1/2002 | Daly | H04N 5/2224 348/E5.022 |
| 8,339,418 | B1* | 12/2012 | Nesmith | G06T 15/50 345/633 |
| 10,659,822 | B2 | 5/2020 | Onuma | |
| 11,202,104 | B2 | 12/2021 | Onuma | |
| 2002/0018070 | A1* | 2/2002 | Lanier | H04N 5/272 348/E5.058 |
| 2003/0051255 | A1* | 3/2003 | Bulman | G06Q 40/12 725/135 |
| 2006/0061567 | A1* | 3/2006 | Ouchi | G06T 13/20 345/419 |
| 2006/0165310 | A1* | 7/2006 | Mack | H04N 5/272 382/284 |
| 2009/0033737 | A1* | 2/2009 | Goose | H04N 7/15 348/E7.083 |
| 2011/0249090 | A1* | 10/2011 | Moore | G06T 19/006 348/E13.064 |
| 2013/0142452 | A1* | 6/2013 | Shionozaki | G06T 15/205 382/284 |
| 2019/0221029 | A1 | 7/2019 | Yoneda | |
| 2019/0355172 | A1* | 11/2019 | Dsouza | G06F 3/017 |
| 2021/0097765 | A1* | 4/2021 | Lehman | G06T 19/20 |
| 2021/0134058 | A1 | 5/2021 | Ito et al. | |
| 2022/0383586 | A1 | 12/2022 | Onuma | |

FOREIGN PATENT DOCUMENTS

| | | | |
|---|---|---|---|
| JP | 2018-074294 | A | 5/2018 |
| WO | 2018/084087 | A1 | 5/2018 |
| WO | 2019/097639 | A1 | 5/2019 |

OTHER PUBLICATIONS

Jordan, L., "Create an Irregular Object with Cast Shadow in Apple Motion: Larry Jordan" XP093017197 (Jun. 2021) pp. 1-8, retrieved from the Internet: https://web. archive. org/web/2021 061 90 71 941 /https ://larryjord an. com/articles/create-an-irregular-object-with-cast-shad ow-in-apple-motion/.

Anonymous, "2D lights and shadows—Godot engine (stable) documentation in English—Too many links for CiteNpl:5681" XP093017206 (Jun. 2021) pp. 1-16, retrieved from the Internet: https://web. archive. org/web/202106031 34121 /https ://docs.god otengine. org/en/stable/tutorials/2d/2d_lights_and_sh ad ows. html.

Extended European Search Report issued in corresponding EP Patent Application No. 22190212.5, dated Feb. 1, 2023, pp. 1-11.

* cited by examiner

IMAGE PROCESSING APPARATUS, IMAGE PROCESSING METHOD, AND STORAGE MEDIUM FOR GENERATING COMPOSITE IMAGE USING 2D IMAGE AND 3DCG

BACKGROUND

Field

The present disclosure relates to an image processing technique to composite a two-dimensional image and a three-dimensional computer graphics.

Description of the Related Art

There is a video game creation platform, a so-called game engine, which renders a three-dimensional computer graphics (3DCG) real time. In recent years, the technique to obtain high image quality of the game engine has been improving and it has been made possible to produce a representation real time by a realistic composite image (see Japanese Patent Laid-Open No. 2018-074294). In response to this, in the field of image production as well, 3DCG production using a game engine has been utilized. As one of utilization methods, the 3DCG production is utilized in a studio (generally called a "virtual studio") in which an image obtained by compositing real time a two-dimensional moving image (2D image) captured in a green back studio and a 3DCG is generated and distributed.

In composition of a 2D image and a 3DCG, a screen is provided at a predetermined position on the 3DCG space and an image is obtained by sequentially projecting images of an object captured by a camera onto the screen and performing rendering. Because of this, in a case where the camera (viewpoint) is moved considerably during image capturing or the object moves considerably, the shift in the position relative to the screen, the inconsistency in the positional relationship in the depth direction with the background created by CG, or the like occurs and an unnatural image is obtained sometimes.

SUMMARY

The image processing apparatus includes: one or more memories that store instructions; and one or more processors that execute the instructions to perform: obtaining a two-dimensional image, corresponding to a specific viewpoint, including a foreground object, a parameter specifying a condition at the time of obtaining the two-dimensional image, and position and shape data representing a three-dimensional position and a shape of the foreground object included in the two-dimensional image; and generating an image including the foreground object and a background object by arranging a screen based on the position and shape data in a computer graphics space including the background object and projecting the image of the foreground object included in the two-dimensional image onto the screen based on the parameter.

Further features of the present disclosure will become apparent from the following description of exemplary embodiments with reference to the attached drawings.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<System Configuration>

Figure 1:
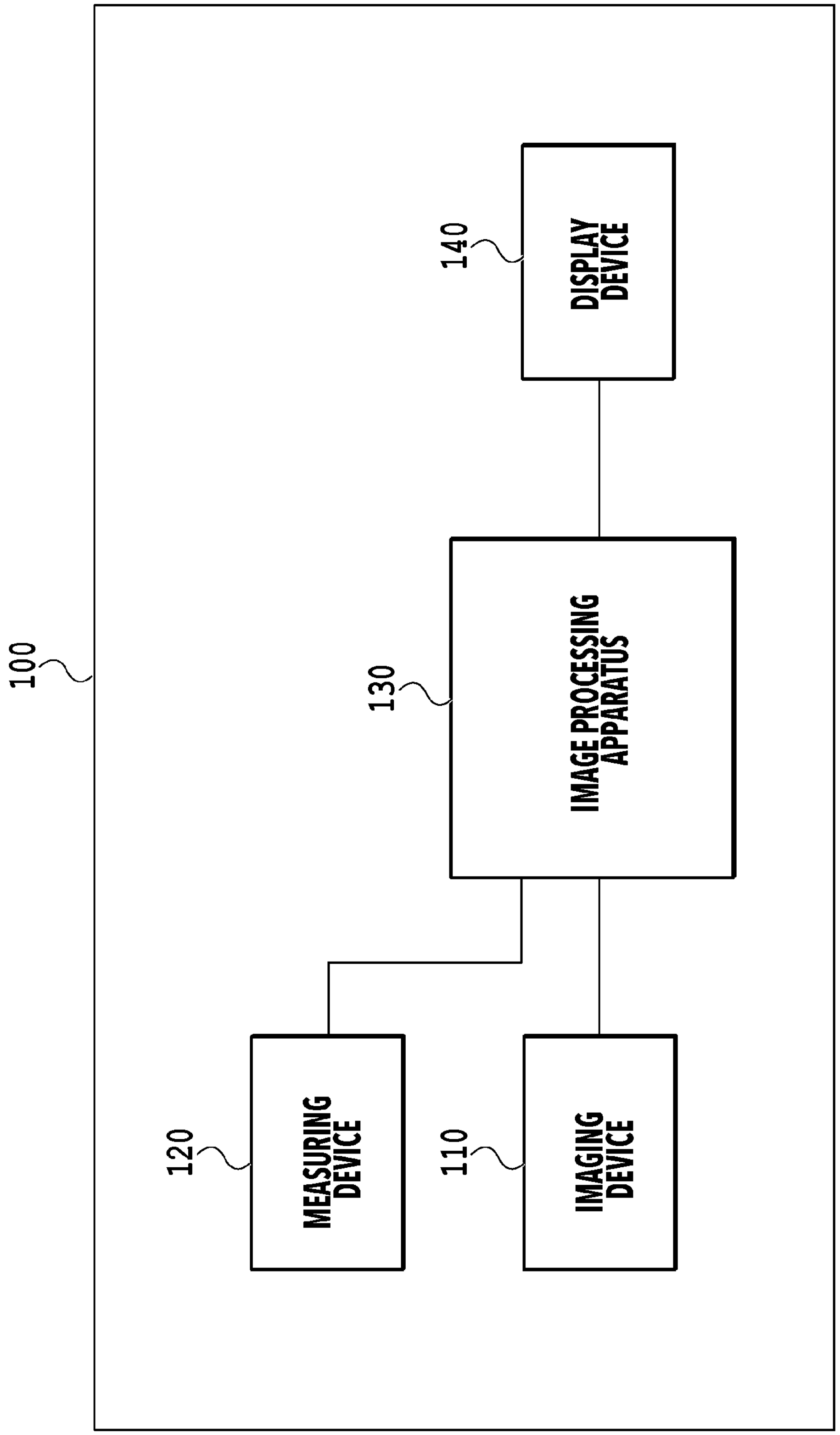
FIG. 1 is a diagram showing an example of a configuration of an image processing system for generating a virtual viewpoint image.

FIG. 1 is a diagram showing an example of the configuration of an image processing system for generating a virtual viewpoint image according to the present embodiment. An image processing system 100 has an imaging device (camera) 110, a measuring device 120, an image processing apparatus 130, and a display device 140. In the image processing system 100, an image captured by the camera 110 is composited with a three-dimensional computer graphics in the image processing apparatus 130 and displayed on the display device 140.

For example, the camera 110 captures an object (in the following, called "foreground object"), such as a performer who is a foreground continuously in terms of time in a studio of green back or blue back in which it is possible to perform chroma key image capturing and outputs obtained captured images (moving image). The camera 110 is implemented by, for example, a digital video camera comprising an image signal interface represented by the serial digital interface (SDI). The camera 110 transmits the image signal to be output to the image processing apparatus 130 after attaching time information represented by a time code thereto. At this time, image capturing parameters are also transmitted, which specify the three-dimensional position (x, y, z), the orientation (pan, tilt, roll), the viewing angle, the lens distortion, the focal length, the resolution and the like of the camera. The image capturing parameters are calculated in advance by performing publicly known camera calibration and stored in a memory or the like. For example, it is possible to obtain the three-dimensional position and orientation of the camera by installing markers in the camera 110 and detecting the markers by a plurality of optical sensors arranged on the image capturing space. Further, in a case where camera 110 is attached to a crane, a robot arm or the like, it may also be possible to find the position and orientation of the camera 110 based on the position and orientation of the crane or the robot arm.

The measuring device 120 measures the position of the foreground object existing in the real image capturing space, such as a studio, and a rough shape thereof. The measuring device 120 of the present embodiment has an image capturing function and measures the position and rough shape thereof by analyzing a plurality of images obtained by capturing the foreground object from a plurality of directions. For example, by using two cameras, the position, orientation and the like of a person or the like are detected real time without using markers. Due to this, data (in the following, called "position and shape data") indicating the position and rough shape of the foreground object in the image capturing space is generated and output, in the present embodiment, it is assumed that position and shape data describing the three-dimensional position (x, y, z) of each vertex of a rectangular parallelepiped circumscribing the foreground object and the length of each side of the rectangular parallelepiped is generated and output. However, the configuration of the measuring device 120 is not limited to the above-described example and a local positioning system using a wireless LAN or Bluetooth may be accepted. Further, it may also be possible to detect a three-dimensional position using the GPS by attaching a sensor to a person or the like. In that case, it is sufficient to generate position and shape data by adding information on the rough size of a person or the like, which is investigated in advance. The object shape at this time may be a simple one and a polyhedron circumscribing the object may be accepted.

The image processing apparatus 130 generates a composite image in which the foreground object seems to exist in the 3DCG space by projecting the image of the foreground object obtained by the camera 110 onto the 3DCG space and performing rendering of the image from the same viewpoint as that at the time of image capturing. Details of the function of the image processing apparatus 130 will be described later.

The display device 140 is, for example, a liquid crystal display or the like and obtains and displays image data (data of UI screen for graphical user interface and data of composite image) that is sent from the image processing apparatus 130.

In the present embodiment, the one camera 110 is supposed, but the configuration may be one in which, for example, a plurality of the cameras 110 is used. For example, it may also be possible to have the same number of image processing apparatuses 130 as the number of cameras 110 and switch the composite image obtained by each system to another by a device, such as a switcher, and output the composite image. Alternatively, it may also be possible to switch the captured image that is used for composition with the 3DCG to another among the captured images input from each of the plurality of the cameras 110 and process the captured image inside the image processing apparatus 130.

<About Hardware Configuration>

Figure 2:
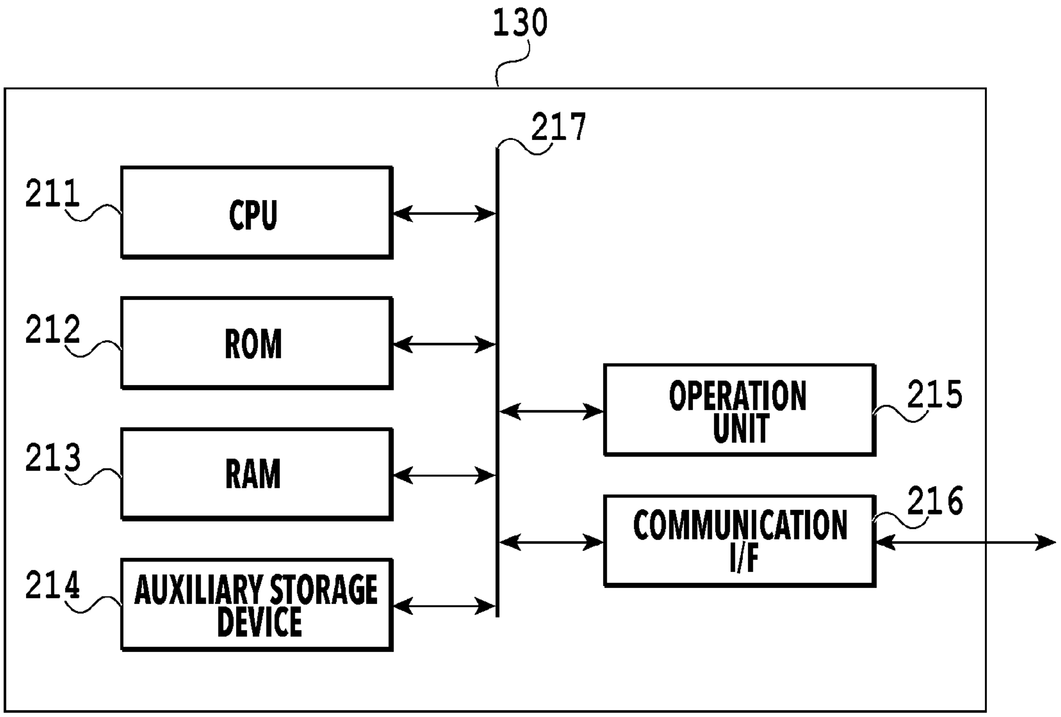
FIG. 2 is a diagram showing an example of a hardware configuration of an image processing apparatus.

FIG. 2 is a diagram showing an example of the hardware configuration of the image processing apparatus 130. The image processing apparatus 130, which is an information processing apparatus, has a CPU 211, a ROM 212, a RAM 213, an auxiliary storage device 214, an operation unit 215, a communication I/F 216, and a bus 217.

The CPU 211 implements each function of the image processing apparatus 130 by controlling the entire image processing apparatus 130 by using computer programs and data stored in the ROM 212 or the RAM 213. It may also be possible for the image processing apparatus 130 to have one dedicated piece of hardware or a plurality of dedicated pieces of hardware different from the CPU 211 or a GPU (Graphics Processing Unit). Then, it may also be possible for the GPU or the dedicated hardware to perform at least part of the processing that is performed by the CPU 211. As examples of the dedicated hardware, there are an ASIC (Application Specific Integrated Circuit), an FPGA (Field Programmable Gate Array), a DSP (Digital Signal Processor), and the like.

The ROM 212 stores programs and the like that do not need to be changed. The RAM 213 temporarily stores programs and data that are supplied from the auxiliary storage device 214, data that is supplied from the outside via the communication I/F 216, and the like. The auxiliary storage device 214 includes, for example, a hard disk drive and the like and stores various kinds of data, such as image data and voice data.

The operation unit 215 includes, for example, a keyboard, a mouse and the like and inputs various instructions to the CPU 2111 upon receipt of a user operation. The CPU 211 operates as the display control unit configured to control the display device 104 and the operation control unit configured to control the operation unit 215. The communication I/F 216 is used for communication of the image processing apparatus 130 with an external device. For example, in a case where the image processing apparatus 130 is connected with an external device via a wire, a communication cable is connected to the communication I/F 216. In a case where the image processing apparatus 130 has a function to wirelessly communicate with an external device, the communication I/F 216 comprises an antenna.

The bus 217 connects each unit of the image processing apparatus 130 and transmits information. In the present embodiment, the imaging device 110, the measuring device 120, and the display device 140 are provided as external devices, but it may also be possible to provide each in the form existing internally as one of the function units of the image processing apparatus 130.

<Internal Configuration of Image Processing Apparatus>

Figure 3:
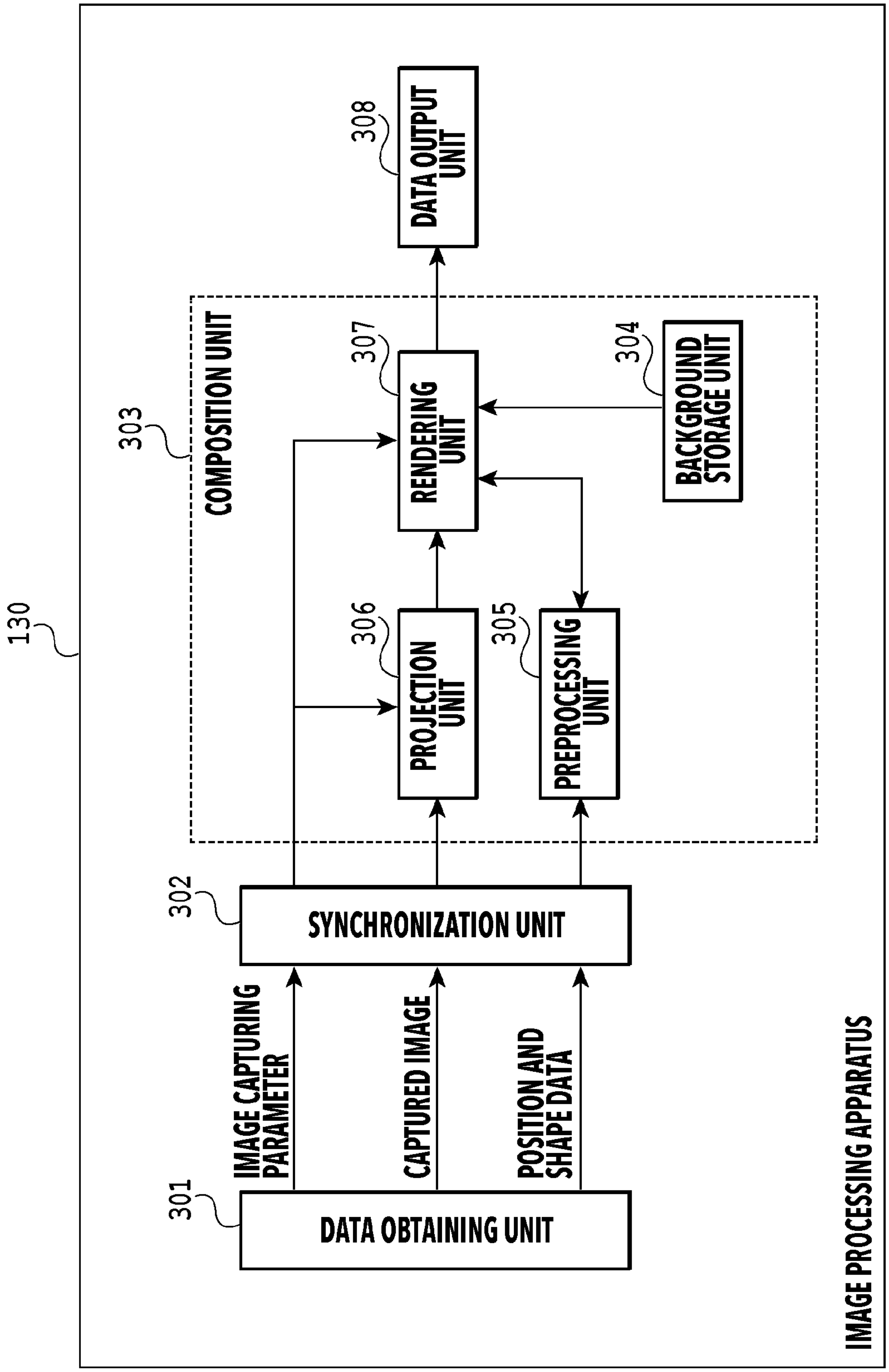
FIG. 3 is a diagram showing an example of an internal configuration of the image processing apparatus according to a first embodiment.

FIG. 3 is a diagram showing an example of the internal configuration of the image processing apparatus 130 that composites the captured image of the foreground object, which is obtained by the camera 110, with the 3DCG. The image processing apparatus 130 has each function unit, that is, a data obtaining unit 301, a synchronization unit 302, a composition unit 303, and a data output unit 308. Then, the composition unit 303 has a background storage unit 304, a preprocessing unit 305, a projection unit 306, and a rendering unit 307. It may also be possible to constitute the image processing apparatus 130 by a plurality of electronic devices. In the following, each function unit is explained.

The data obtaining unit 301 receives and obtains the captured image data of the foreground object from the camera 110 along with the image capturing parameter. Further, the data obtaining unit 301 obtains the position and shape data of the foreground object from the measuring device 120. The data obtained by the data obtaining unit 301 is input to the synchronization unit 302. It is desirable but not mandatory for the captured image data and the position and shape data to be obtained at timing synchronized with each other. In a case where the obtaining period (sampling period) is different between both data, for example, it may also be possible to separately generate position and shape data synchronized with the captured image data based on the variation amount of the obtained data. The image capturing parameter may be transmitted (or received) at the same timing as that of the captured image data or may be transmitted (or received) at different timing. Further, the image capturing parameter may be transmitted (or received) at the time of being changed. In this case, it is possible to reduce the amount of data that is transmitted (or received). The frequency, the period, and the frame rate of the transmission (or reception) of the image capturing parameter may be less than the frequency, the period, and the frame rate of the transmission (or reception) of the captured image data.

The synchronization unit 210 makes adjustment of the delay time between data due to the difference in the timing of the generation, transmission, and obtaining of each of the input data. Specifically, a variable length buffer is provided for each of the data and each of the data synchronized via the buffer is output to the composition unit 303. At the time of establishing synchronization between data, the delay time is adjusted so that the time of output is the same between data by using the time information attached to each of the data and changing the number of buffer stages of the other data in accordance with the data whose input is the latest.

The composition unit 303 generates a composite image in which the foreground object seems to exist in the 3DCG space by projecting the image of the foreground object onto the 3DCG space based on the captured image data and the position and shape data of the foreground object. Details of the composition unit 303 will be described later.

The data output unit 308 outputs the data of the composite image generated by the composition unit 303 to the external device, such as the display device 140.

The above is the function configuration of the image processing apparatus according to the present embodiment. In the present embodiment, the synchronization among the three of the data, that is, the captured image data, the image capturing parameter, and the position and shape data is adjusted by the one synchronization unit 302, but the configuration is not limited to the configuration such as this. For example, the configuration may be one in which each of the imaging device 110 and the measuring device 120 is caused to have an internal buffer and data is transmitted to the image processing apparatus 130 at the same timing.

<Details of Composition Unit>

Figure 4:
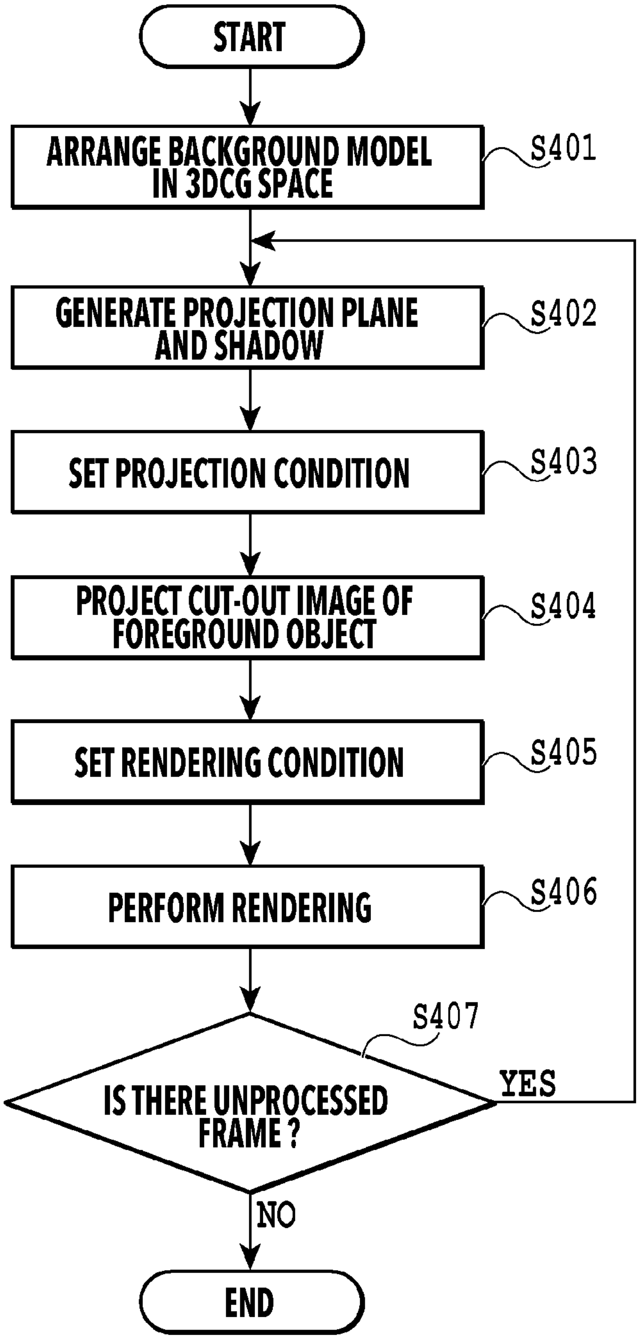
FIG. 4 is a flowchart showing a flow of processing in a composition unit.

As shown in FIG. 3, the composition unit 303 has the background storage unit 304, the preprocessing unit 305, the projection unit 306, and the rendering unit 307. With reference to the flowchart in FIG. 4, details of the function of the composition unit 303 are explained. The series of processing shown in the flowchart in FIG. 4 is implemented by the CPU 211 reading the control program stored in the ROM 212, the auxiliary storage device 214 or the like, loading the program onto the RAM 213, and executing the program. In the following explanation, symbol "S" means a step.

Figure 5A:
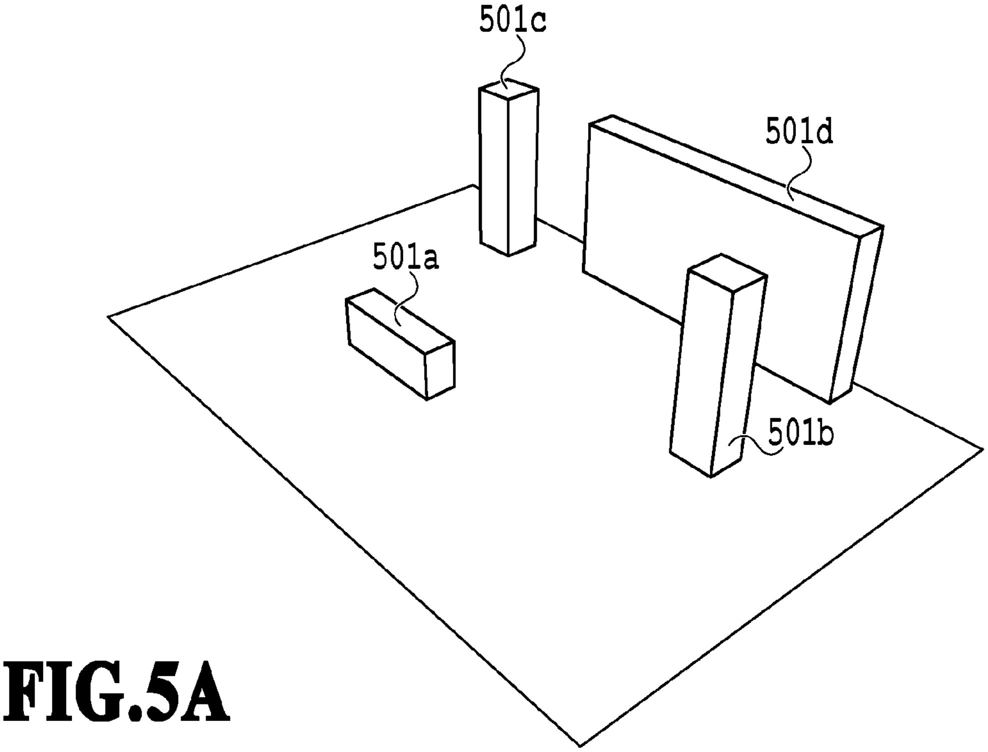
FIG. 5A is a diagram showing an example of a 3DCG space in which background models are arranged and FIG. 5B is a diagram showing a state where screens and pseudo shadows are formed within the 3DCG space in which the background models are arranged.

In a case where each of the above-described data is input to the composition unit 303 from the synchronization unit 302, first, at S401, the rendering unit 307 reads the CG data of the background object from the background storage unit 304 and arranges the background object by the CG in the 3DCG space. Here, the CG data stored in the background storage unit 304 is data indicating the three-dimensional shape and the texture (color, material appearance and the like) of each object, which is the background other than the foreground object arranged in the 3DCG space, such as pillars and fixtures. The CG data may have three-dimensional position information in the 3DCG space. Further, the CG data may have three-dimensional position information in the real space. FIG. 5A is a diagram showing an example of the 3DCG space in which the CG background objects are arranged and in this example, four background objects 501*a* to 501*d* indicated by solid line rectangular parallelepipeds are arranged in the 3DCG space. It is assumed that at which position within the 3DCG space the background object is arranged is determined in advance for each background object. Each piece of processing at subsequent S402 to S407 is performed for each frame of the input captured image data.

Figure 5B:
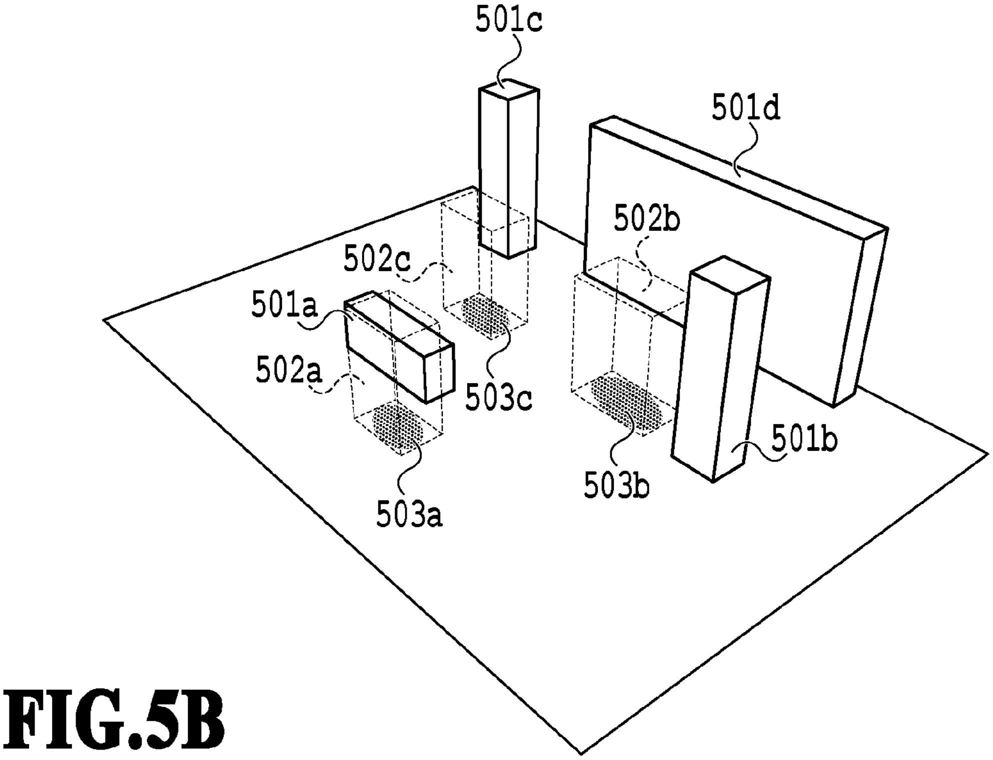

At next S402, the preprocessing unit 305 arranges a screen onto which the image of the foreground object in the processing-target frame is projected within the 3DCG space based on the position and shape data that is input from the synchronization unit 302. Further, the preprocessing unit 305 forms a pseudo shadow of the foreground object within the 3DCG space. FIG. 5B shows a state where three screens 502*a* to 502*c* indicated by broken lines are arranged and further, pseudo shadows 503*a* to 503*c* indicated by hatching are formed within the 3DCG space shown in FIG. 5A described above. In the present embodiment, as the screen, a transparent bounding box corresponding to the rectangular parallelepiped circumscribing the foreground object is arranged in the 3DCG space. The reason the screen is represented by a rectangular parallelepiped is that the rectangular parallelepiped is the simplest solid that surrounds the three-dimensional shaped foreground object. In a case where the screen is arranged as a two-dimensional plane, it is possible to perform projection from the front surface without any problem, but in a case where projection is performed from the side surface or the top surface, no plane is formed, and therefore, an appropriate projected image is not obtained. Because of this, in the present embodiment, the screen is arranged as a rectangular parallelepiped. Although it is possible to define the screen as a "surface always facing the viewpoint at the time of projection", in a case where, for example, the foreground object is a complicated shape like a person, the area thereof considerably changes depending on the viewing direction, and therefore, it is necessary to perform calculation each time. On the other hand, in a case where the screen is a rectangular parallelepiped, by taking the maximum value and the minimum value of the coordinates (x, y, z) indicating the three-dimensional position of each point of the rectangular parallelepiped, the projected image of the foreground object is included therein without exception, and therefore, it is no longer necessary to perform calculation each time. Further, the rectangular parallelepiped has the advantage of being capable of suppressing the data amount as well, and therefore, reducing the load of the processing, such as transmission. The reason the screen is made transparent is to prevent a user from visually recognizing the screen in the composite image. For the reason such as this, in the present embodiment, a transparent bounding box is employed as the screen. Then, in order to cause the image of the projected foreground object to seem to be in touch with the ground, the representation of shadow is important, but the position and shape data of the present embodiment does not include information on the detailed shape and orientation of the foreground object, and therefore, it is difficult to represent an accurate shadow based on the light source. Consequently, the feeling of being in touch with the ground is improved by drawing a pseudo shadow in a simplified shape. Specifically, a translucent black or gray ellipse corresponding to the rough shape and size indicated by the position and shape data is drawn in the vicinity of the bottom surface of the bounding box as the screen. Due to this, a pseudo shadow is displayed in such a manner that the shadow is interlocked with the movement of the foreground object, and therefore, a natural composite image in which the foreground object seems to be in touch with the ground in the 3DCG space is obtained. It is desirable to form the pseudo shadow such as this based on the light source in the vicinity of the bottom surface of the bounding box as the screen so that the shadow is prevented from becoming unnatural, for example, such as the shadow extending toward the light source. Depending on the position of the virtual light source, the pseudo shadow may be formed outside the bounding box. For example, this is a case where light is emitted from the side of the background object 501*d* toward the side of the background object 501*a*. Further, the pseudo shadow may be formed for the background object.

At next S403, the projection unit 306 sets conditions (projection parameters) at the time of projecting the image of the foreground object onto the screen described above based on the image capturing parameters of the processing-target frame. Specifically, the setting is performed by adjusting the viewpoint, the orientation, the viewing angle and the like at the time of performing projection to the conditions at the time of the processing-target frame being captured so that both the conditions match with each other.

Figure 6A:
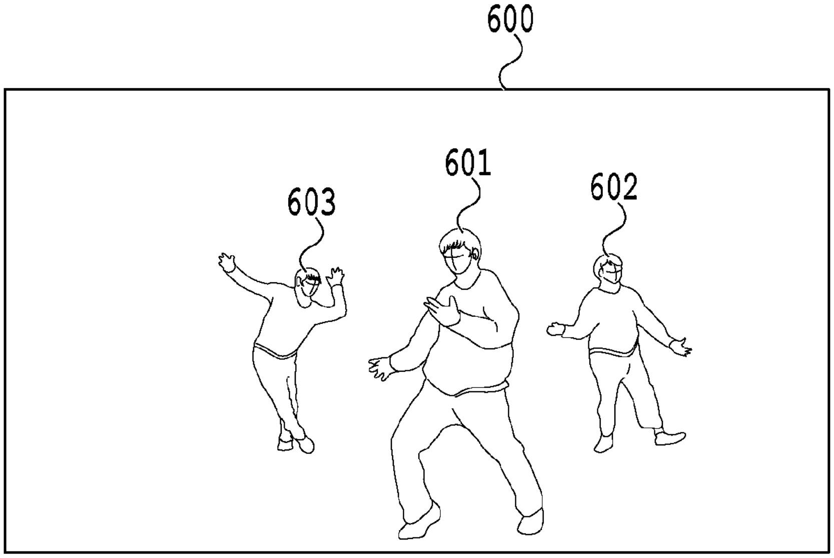
FIG. 6A is a diagram explaining chroma key processing and FIG. 6B is a diagram showing a state where cut-out images are projected onto the screens generated on the 3DCG space.
Figure 6B:
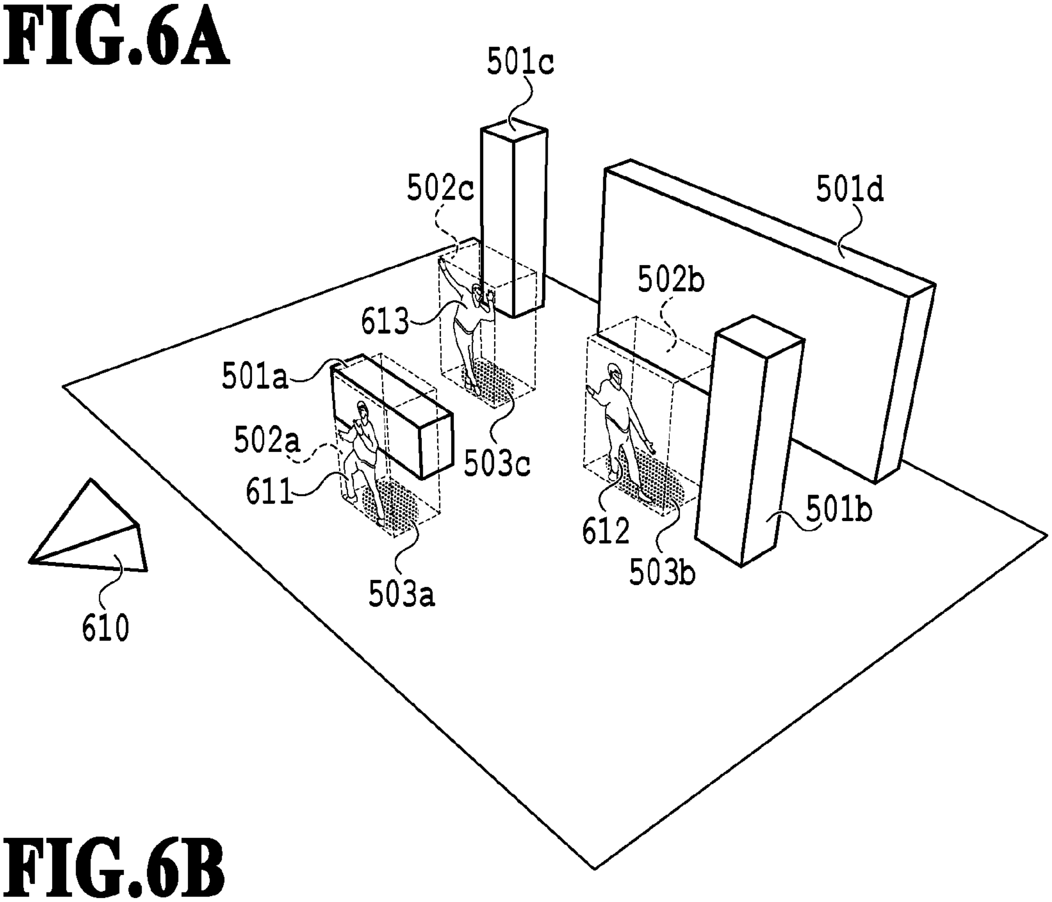

Then, at S404, the projection unit 306 projects the image of the processing-target frame onto the screen generated at S402. At this time, onto the screen, the partial image (cut-out image) is projected, which is obtained by cutting out only the image area corresponding to the foreground object obtained by performing the chroma key processing for the image of the processing-target frame. FIG. 6A is a diagram explaining the chroma key processing. In the example in FIG. 6A, three cut-out images corresponding to persons 601 to 603 respectively are extracted from a processing-target frame 600. FIG. 6B shows the state where each corresponding cut-out image is projected onto each screen (see FIG. 5B) generated on the 3DCG space. As described above, the processing to make the screen transparent has been performed, and therefore, it is unlikely that the margin of the screen after the cut-out image is projected is visually recognized by a user.

At next S405, the rendering unit 307 sets conditions (rendering parameters) at the time of performing rendering by taking the 3DCG space onto which the cut-out image has been projected as a target based on the image capturing parameters of the processing-target frame. In FIG. 6B described above, a viewpoint mark 610 indicates the rendering viewpoint that is set in accordance with the image capturing viewpoint of the camera 110. That is, the rendering viewpoint is set so that the position, the orientation, the viewing angle and the like thereof match with those of the camera 110 at the time of image capturing of the processing-target frame.

Figure 7:
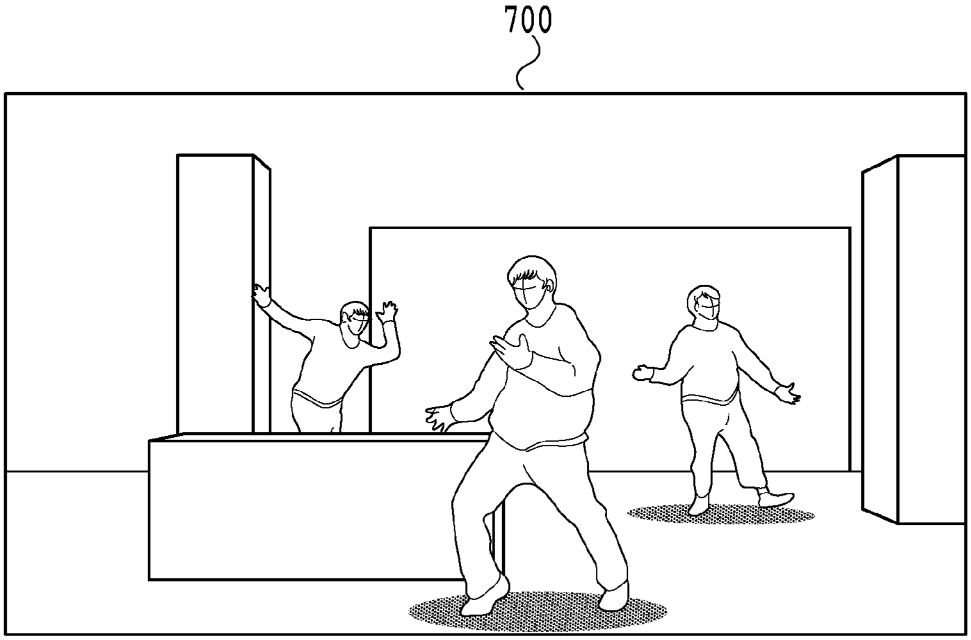
FIG. 7 is a diagram showing an example of a composite image.

Then, at S406, the rendering unit 307 performs rendering processing that takes the 3DCG space as a target, which is in the state where the cut-out image of the foreground object has been projected onto the transparent screen, in accordance with the rendering parameters that are set at S405. In the rendering processing, processing to employ the color value (pixel value) closer to the rendering viewpoint is performed for each pixel based on the distance from the set rendering viewpoint to each object. For example, processing to sequentially determine the value of the pixel constituting the composite image is performed by first generating a depth image indicating the distance from the rendering viewpoint to each object from the information on the three-dimensional positions of the foreground object and the background object, which has been made clear, and by referring to this. Due to this, a composite image 700 as shown in FIG. 7 is obtained, in which the shielding relationship among the objects is reflected, for example, such as that the background object located in front of the foreground object is displayed in front of the foreground object on the 3DCG space. In this manner, a natural composite image is obtained in which the foreground object existing in the real three-dimensional space (image capturing space) seems to exist in the 3DCG space.

At S407, whether or not instructions to stop image generation have been given is determined. Until the instructions to stop image generation are given, the processing returns to S402 and the input processing-target frame is continued to be processed one by one.

Figure 8A:
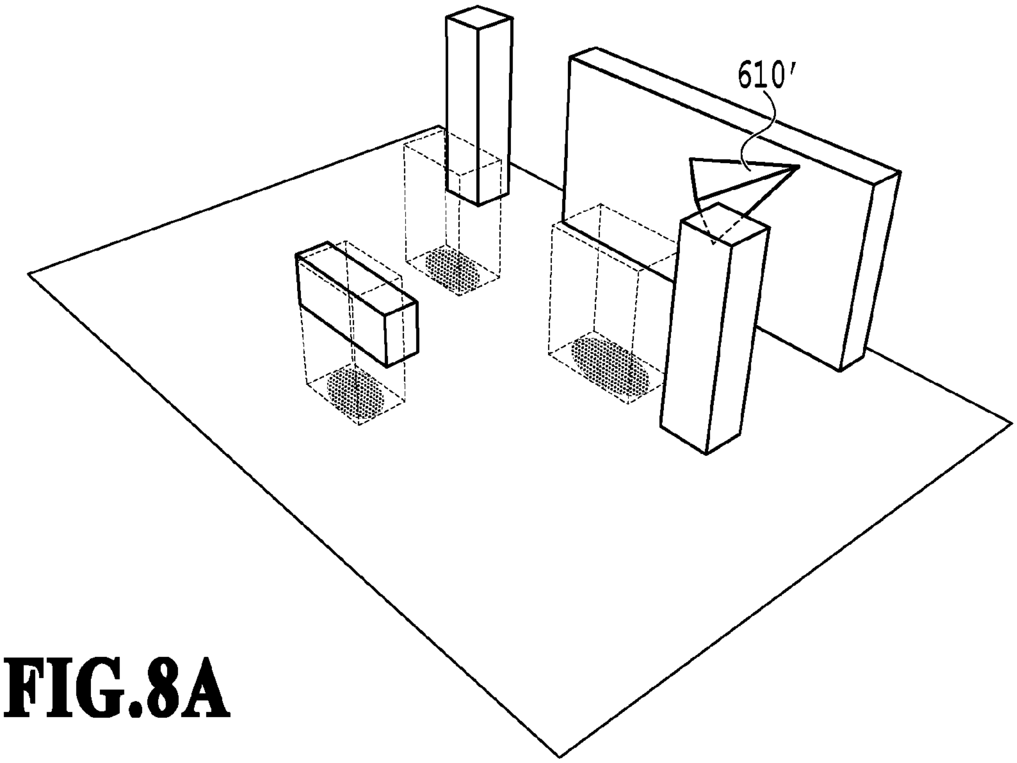
FIG. 8A is a diagram showing an example in which a camera moves considerably and FIG. 8B is a diagram showing a state where cut-out images are projected onto the screens generated on the 3DCG space.
Figure 8B:
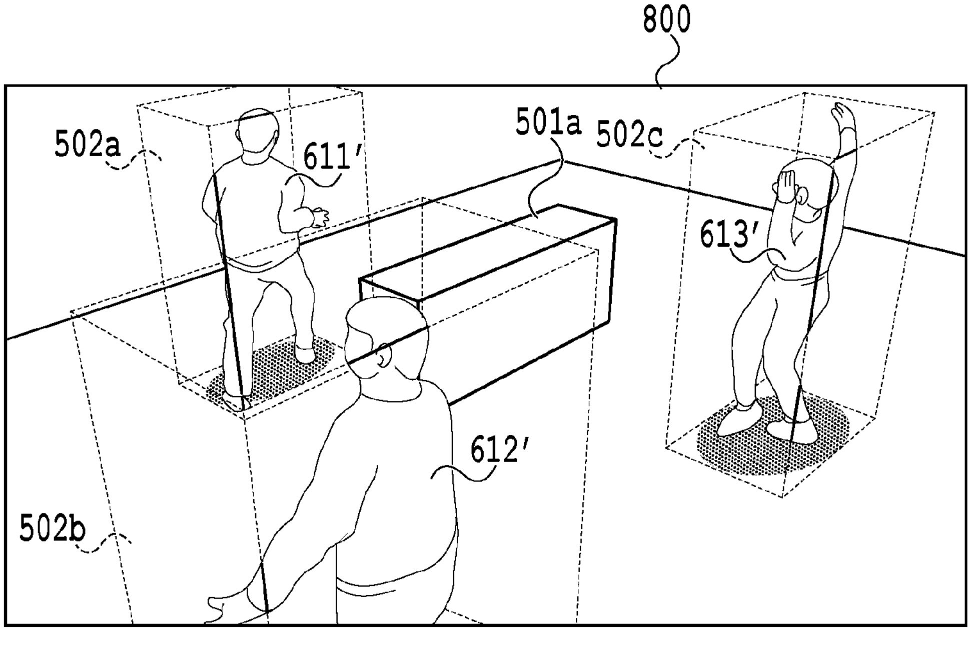

The above is the contents of the processing in the composition unit 303. Due to the above-described function configuration, it is possible for the composition unit 303 to composite the image of the foreground object, which is captured by the camera 110, with the 3DCG with a high accuracy while following the movement of the foreground object and the camera 110. For example, it is assumed that the camera 110 moves considerably in the obliquely backward direction of the performers as indicated by a viewpoint mark 610' in FIG. 8A. In this case, as shown in FIG. 8B, onto the screens on the 3DCG space, cut-out images 611', 612', and 613' of each foreground object are projected from the same viewpoint as that of the camera 110 having moved. In this manner, even in a case where the camera 110 or the object moves considerably, it is possible to obtain a composite image correctly representing the shielding relationship and the like among the objects.

<Modification Example>

The case has been explained where the image capturing of the foreground object by the camera 110 is performed in the environment of so-called green back or blue back on the premise of the chrome key processing, but the image capturing in the environment such as that is not mandatory. For example, it may also be possible to distinguish between the performer and the other background in the captured image obtained by performing image capturing in a normal studio by the object recognition technique and use the image for projection, which is obtained by performing image processing to cut out only the image area corresponding to the performer.

Further, the case has been explained where the bounding box circumscribing the foreground object is employed as the screen for projection, but the shape of the screen is not limited to the shape of a rectangular parallelepiped. For example, it may also be possible to estimate the orientation of a foreground object by utilizing images obtained by capturing the foreground object in a plurality of directions, generate a mesh model representing the estimated orientation, and employ a three-dimensional shaped screen fitting to the orientation of the foreground object. Due to this, it is possible to arrange a screen like a mannequin simulating the orientation of the performer at each time in the 3DCG space.

Figure 9A:
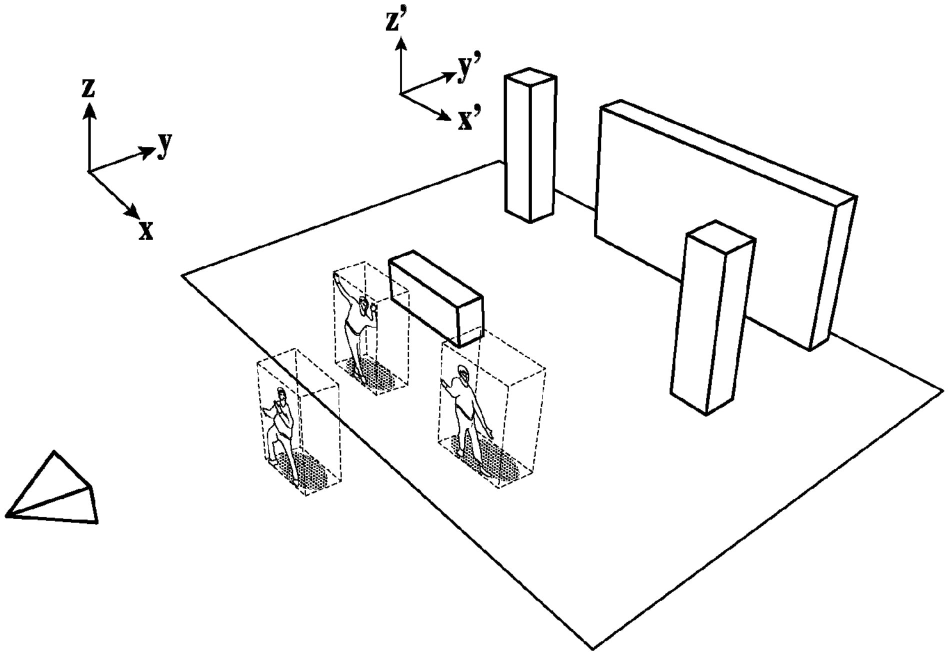
FIG. 9A is a diagram showing an example in which a projection viewpoint and a rendering viewpoint are not matched with an image capturing viewpoint and FIG. 9B is a diagram showing an example of a case where the size of the foreground objects is increased.
Figure 9B:
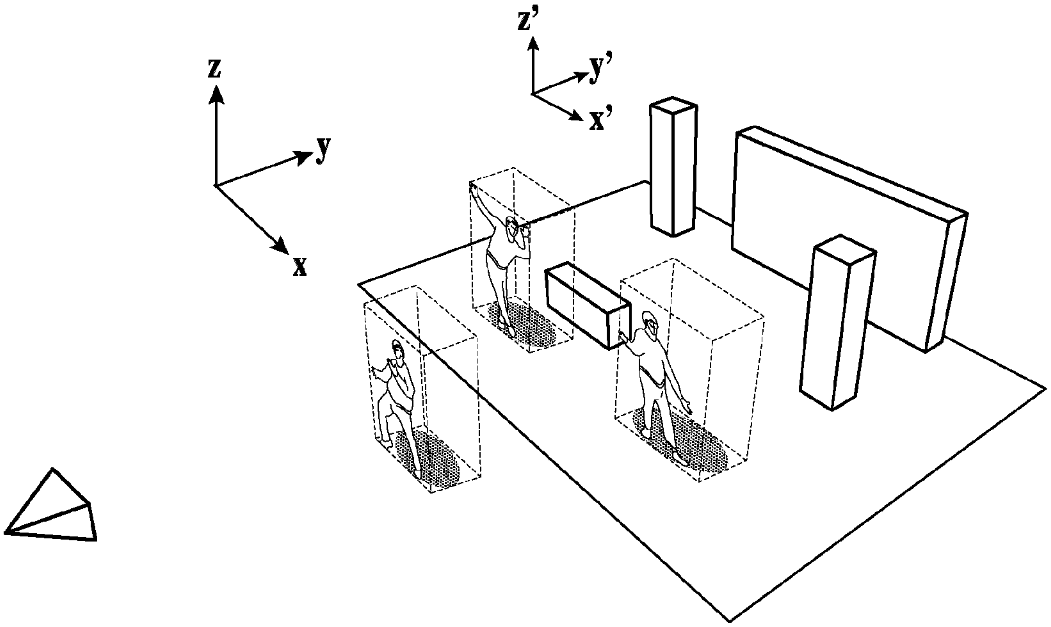

Further, in the above-described embodiment, the coordinate system (x, y, z) of the projection viewpoint and the screen and the coordinate system (x', y', z') of the 3DCG space in which the background model is arranged are caused to match with each other, but this is not the mandatory condition in the present embodiment. What is required is that the relative positional relationship between the foreground object and the image capturing viewpoint and the relative positional relationship between the screen, the projection viewpoint, and the rendering viewpoint match with each other. In a case where these relative positional relationships match with each other, it may also be possible to move the screen, the projection viewpoint, and the rendering viewpoint to any coordinates on the 3DCG space and change the orientation. Further, by changing the magnification of the screen and the magnification of the relative distance together, it may also be possible to change the relationship in size between the foreground object and the 3DCG space. FIG. 9A is an example in a case where each screen is arranged in front of the background objects as well as setting the projection viewpoint and the rendering viewpoint farther from the image capturing viewpoint. FIG. 9B is an example in a case where the size of the foreground object is increased by further changing the magnification of each screen and the magnification of the relative distance together. In a case of FIG. 9B, the size of the coordinate system itself is changed (for example, the coordinate system is changed so that in a case where 1 cm in the original image corresponds to 1 m in the real space, 1 cm on the image corresponds to 50 cm in the real space), and therefore, the absolute distance of the projection viewpoint is increased. As described above, it is also possible to produce a representation in which the foreground object has moved or a representation in which the foreground object has become smaller or larger.

Figure 10A:
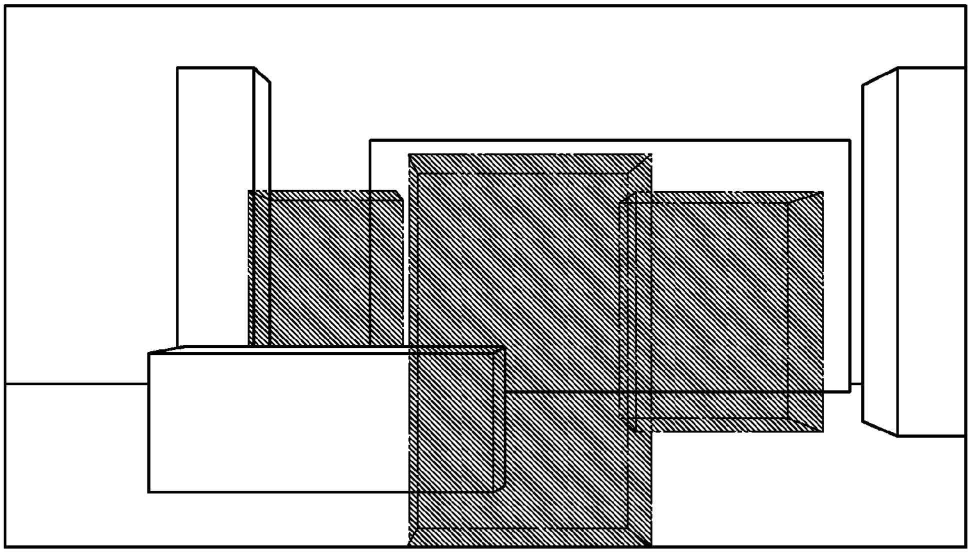
FIG. 10A is a diagram showing an example of a mask image of the screens.
Figure 10B:
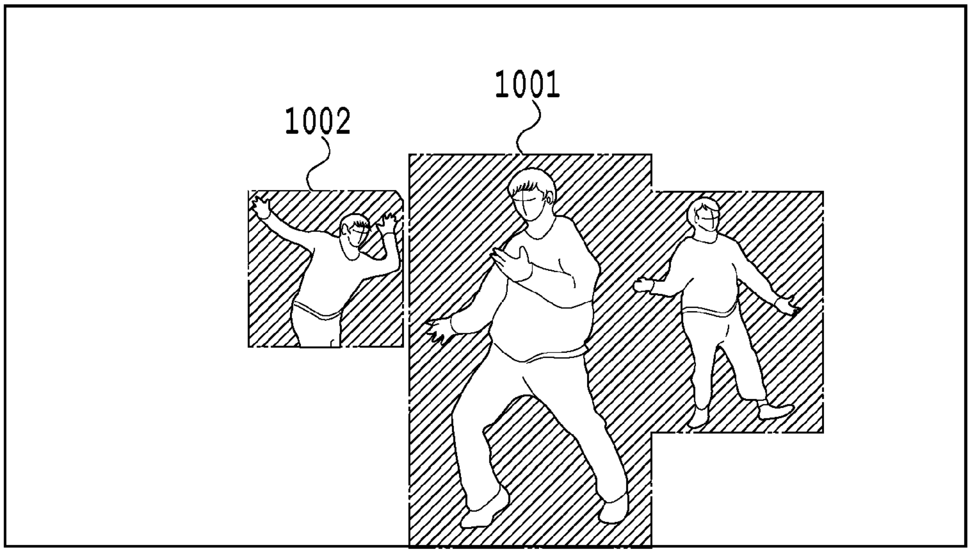
FIG. 10B is a diagram showing an example of cut-out images obtained from the mask image.
Figure 11A:
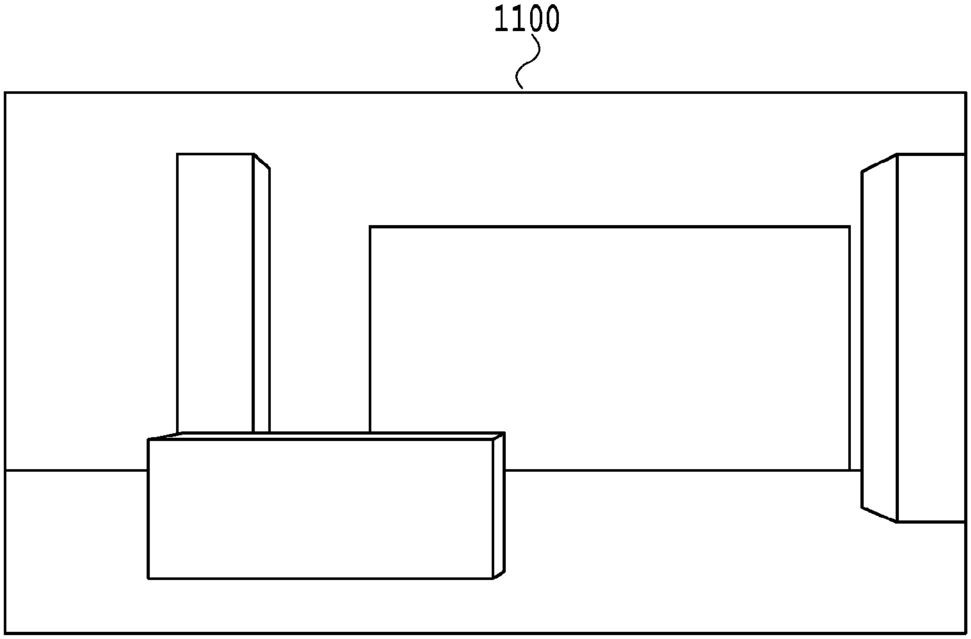
FIG. 11A is a diagram showing an example of a rendering image according to a modification example and FIG. 11B is a diagram showing an example of a composite image according to the modification example.
Figure 11B:
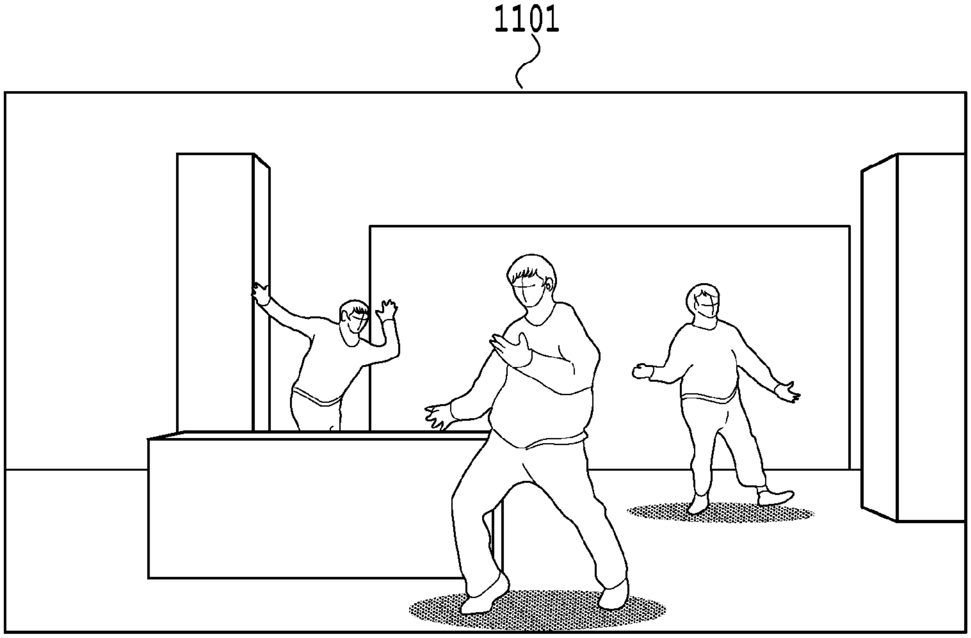

Further, the cut-out image of the foreground object is projected onto the screen and rendering is performed therefor, but the order of the processing is not necessarily limited to the order such as this. For example, it may also be possible to obtain a composite image 1101 shown in FIG. 11B by the following procedure: a mask image of the screen as shown, for example, in FIG. 10A is obtained, which also takes into consideration the shielding relationship in a case of being viewed from the rendering viewpoint, and the like; then, by applying the mask image in FIG. 10A to the captured image in FIG. 6A, cut-out images 1001 and 1002 as shown in FIG. 10B are generated, which are obtained by cutting out the portions of the foreground objects; then, a rendering image 1100 shown in FIG. 11A is generated by performing rendering for the 3DCG space as a target, in which only the CGs of the background objects shown in FIG. 5A are arranged, and the cut-out images 1001 and 1002 shown in FIG. 10B are superimposed on the rendering image 1100. However, in a case of this method, the three-dimensional distance information on the foreground objects is not used at the time of rendering, and therefore, it is difficult to represent the depth of field accurately or to represent a mist or the like in a distant view. Consequently, a composite image with a higher quality is obtained by the method explained in the embodiment.

As above, according to the present embodiment, it is possible to easily obtain a natural composite image in which the 2D image of the foreground object, which is captured by the camera, and the background created by the CG are in harmony with each other.

Second Embodiment

Figure 12:
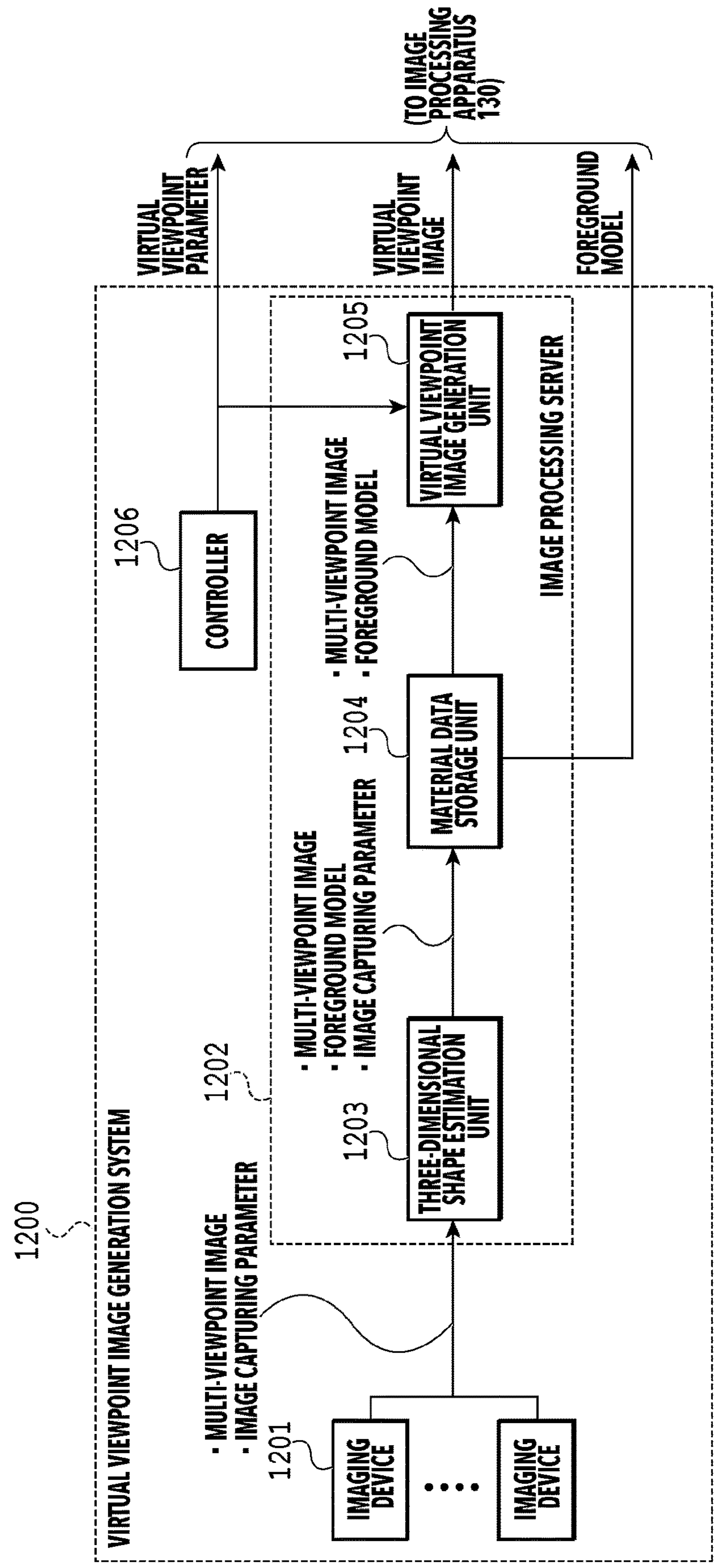
FIG. 12 is a diagram showing an example of an internal configuration of a virtual viewpoint image generation system according to a second embodiment.

Next, an aspect is explained as a second embodiment in which a virtual viewpoint image is used as a two-dimensional image that is composited with a 3DCG. FIG. 12 is a diagram showing an example of the configuration of a system that generates a virtual viewpoint image that is input to the image processing apparatus 130.

As shown in FIG. 12, in the present embodiment, a virtual viewpoint parameter, a virtual viewpoint image, and a foreground model, which are output from a virtual viewpoint image generation system 1200, are input to the image processing apparatus 130. That is, the virtual viewpoint parameter and the virtual viewpoint image of the present embodiment correspond to the image capturing parameter and the captured image, which are output from the camera 110 in the first embodiment, and the foreground model of the present embodiment corresponds to the position and shape data that is output from the measuring device 120 in the first embodiment. In the following, the present embodiment is explained by focusing attention on the difference from the first embodiment.

The virtual viewpoint image generation system 1200 includes a plurality of imaging devices 1201, an image processing server 1202, and a controller 1206. Then, the image processing server 1202 has each function unit of a three-dimensional shape estimation unit 1203, a material data storage unit 1204, and a virtual viewpoint image generation unit 1205.

The plurality of the imaging devices 1201 is arranged so as to surround the foreground object and captures the foreground object from a plurality of directions. Further, the image capturing timing of the plurality of the imaging devices 1201 is synchronized based on a synchronization signal from a time server, not shown schematically. The data of images captured from a plurality of different viewpoints (in the following, called "multi-viewpoint image") by the plurality of the imaging devices 1201 is sent to the image processing server 1202 along with the image capturing parameters indicating the position/orientation, the optical characteristics of each imaging device and the like and input to the three-dimensional shape estimation unit 1203.

The three-dimensional shape estimation unit 1203 extracts the silhouette of the foreground object from each captured image constituting the input multi-viewpoint image and then generates data (in the following, called "foreground model") representing the three-dimensional shape of the foreground object by using the visual hull method or the like. To this foreground model, information representing the three-dimensional position at the time of image capturing is attached. The generated foreground model is sent to the material data storage unit 1204 along with the multi-viewpoint image (including image capturing parameters), which is the source of the generated foreground model.

The material data storage unit 1204 stores/accumulates each of the data of the foreground model, the multi-viewpoint image, and the image capturing parameter, which are input from the three-dimensional shape estimation unit 1203, as the material of a virtual viewpoint image.

The controller 1206 has a joystick for setting a virtual image capturing viewpoint at an arbitrary position in the image capturing space, a keyboard for designating a numerical value, such as the focal length and the viewing angle, and the like and generates virtual viewpoint parameters based on a user input via those components. Here, the virtual viewpoint parameters include information corresponding to the external parameters of the camera representing the position, orientation and the like of the virtual viewpoint, information corresponding to the internal parameters of the camera, such as the focal length and the viewing angle, time information specifying the frame for which a virtual viewpoint image is generated, and the like. The generated virtual viewpoint parameters are sent to the image processing server 1202 and input to the virtual viewpoint image generation unit 1205.

The virtual viewpoint image generation unit 1205 first obtains the data of the foreground model and the captured image at the relevant time from the material data storage unit 1204 based on the time information included in the input virtual viewpoint parameters. Then, for the obtained foreground model, the virtual viewpoint image generation unit 1205 performs coloring in accordance with the designated virtual viewpoint based on the captured image and generates a virtual viewpoint image representing an appearance from the virtual viewpoint. The data of the generated virtual viewpoint image is output to the image processing apparatus 130 along with the virtual viewpoint parameters and the foreground model, which are used for the generation.

<Operation of Image Processing Apparatus>

The image processing apparatus 130 of the present embodiment composites the cut-out image of the virtual viewpoint image generated by the image processing server 1202 with the 3DCG in place of the cut-out image of the captured image by the camera 110 of the first embodiment. Because of this, the data obtaining unit 301 handles the information on the position/orientation, the focal length, the viewing angle and the like of the virtual viewpoint, which is included in the virtual viewpoint parameters, as the image capturing parameters of the first embodiment. That is, the data obtaining unit 301 regards the virtual viewpoint as the camera 110, the optical information on the position/orientation, the viewing angle and the like of the virtual viewpoint as the optical information on the position/orientation, the viewing angle and the like of the camera 110 in the image capturing parameters described previously and outputs the information to the synchronization unit 302. Further, the data obtaining unit 301 of the present embodiment regards the foreground model corresponding to each frame as the position and shape data of the first embodiment based on the time information included in the virtual viewpoint parameters or embedded in the virtual viewpoint image and outputs the foreground model to the synchronization unit 302. At this time, it may also be possible to output the foreground model after performing processing to reduce the amount of data by simplifying the shape of the foreground model so that it is easy for the composition unit 303 in the subsequent stage to perform the processing. As the shape simplification processing, for example, processing to convert the foreground model into the information on the rectangular parallelepiped (bounding box) circumscribing the three-dimensional shape represented by the foreground model, or processing to thin the point cloud or mesh representing the three-dimensional shape is considered. It is needless to say that the processing to take consistency between data, such as format conversion, is performed as needed.

As in the first embodiment, the synchronization unit 302 of the present embodiment establishes synchronization among three of the data of the virtual viewpoint image, the virtual viewpoint parameter, and the foreground model, which are input from the data obtaining unit 301, and outputs them to the composition unit 303.

The composition unit 303 of the present embodiment generates a composite image, which is the composition of the virtual viewpoint image, which is input from the synchronization unit 302, and the 3DCG. Specifically, the preprocessing unit 305 generates a projection screen and a pseudo shadow in the 3DCG space in which the CCI of the background object is arranged based on the foreground model (S401, S402). Next, the projection unit 306 sets projection parameters in accordance with the virtual viewpoint parameters (S403), generates the cut-out image of the foreground object from the virtual viewpoint image, and projects the cut-out image onto the screen (S404). Then, the rendering unit 307 sets rendering parameters in accordance with the virtual viewpoint parameters (S405) and performs rendering processing taking the 3DCG space in the state where the cut-out image of the virtual viewpoint image is projected as a target the number of times corresponding to a predetermined number of frames (S406).

<Modification Example>

In the present embodiment, the synchronization among the three of the data of the virtual viewpoint image, the virtual viewpoint parameter, and the foreground model is established within the image processing apparatus 130 as in the first embodiment, but the configuration is not limited to this. For example, the configuration may be one in which the synchronization among the data is established within the virtual viewpoint image generation system and then the data is integrated into one file by performing, for example, compression or the like and the file is transmitted to the image processing apparatus 130. In a case of the configuration such as this, the synchronization unit 302 within the image processing apparatus 130 is no longer necessary. Then, it is sufficient to develop the received data file in the data obtaining unit 301 and obtain each of the data of the virtual viewpoint image, the virtual viewpoint parameter, and the foreground model and input them to the composition unit 303. Due to the configuration such as this, it is no longer necessary to establish synchronization on the side of the image processing apparatus and at the same time, it is possible to solve the complicatedness of data transfer.

Further, in the present embodiment, the data obtaining unit 301 obtains the corresponding foreground model based on the time information included in the virtual viewpoint parameter or embedded in the virtual viewpoint image, but the configuration is not necessarily limited to this. For example, the configuration may be one in which in the image processing server 1202, the virtual viewpoint image generation unit 1205 associates the foreground model obtained from the material data storage unit 1204 with the frame of the corresponding virtual viewpoint image and then transmits it to the image processing apparatus 130. In this case, it is possible for the data obtaining unit 301 of the image processing apparatus 130 to obtain the foreground model corresponding to each frame without using the time information.

Further, in the present embodiment, the data obtaining unit 301 performs the simplification processing to derive the rough shape from the foreground model that is input from the image processing server 1202, but this is not limited. For example, it may also be possible for the side of the image processing server 1202 to perform the processing up to the simplification processing and input the simplified foreground model (that is, the foreground model whose data amount is reduced) to the image processing apparatus 130.

For example, after the foreground model is generated by performing the normal shape estimation in the three-dimensional shape estimation unit 1203 and further, the simplified foreground model is generated by performing processing to derive the rough shape from the foreground model. Then, the simplified foreground model is also stored and accumulated in the material data storage unit 1204 in addition to the normal foreground model and the simplified foreground model is transmitted to the image processing apparatus 130. By doing so, it is possible to omit the shape simplification processing for the foreground model on the side of the image processing apparatus 130 and it is also possible to reduce the load of the data transfer.

Further, in the present embodiment, the explanation is given that a simplified shape is obtained by thinning the point cloud data from the foreground model, which is the results of the shape estimation, replacing the foreground model with the bounding box, and so on, but the shape simplification is not limited to those. For example, the configuration may be one in which a mesh model, a depth image, orientation information and the like are generated from the shape estimation results and a simplified shape is obtained by utilizing those. Further, it may also be possible to divide the shape estimation results at intervals of a predetermined height, generate the bounding box of each divided portion, and take the set of those as a simplified shape.

Figure 13:
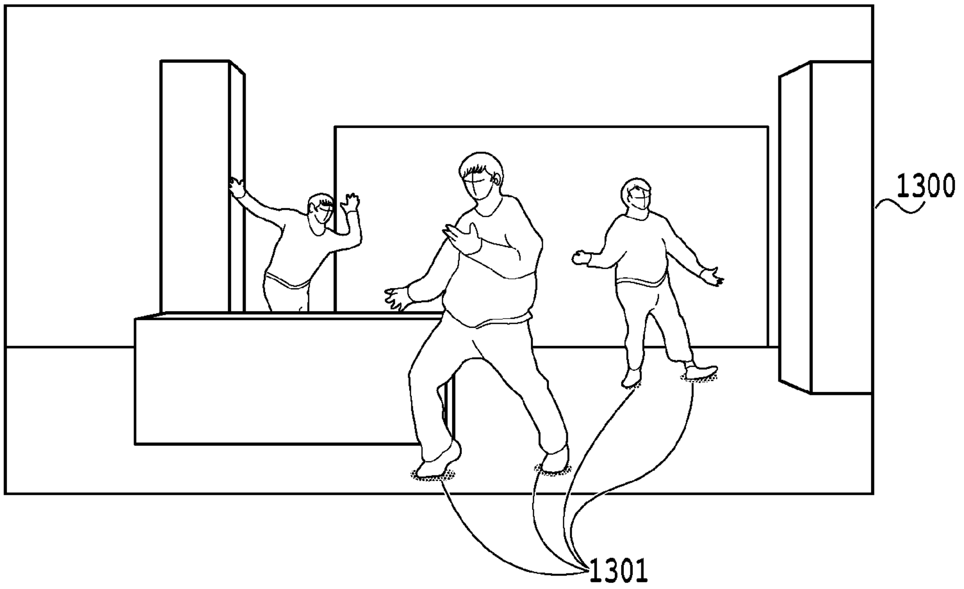
FIG. 13 is a diagram showing an example of a composite image.

Further, it may also be possible to generate a pseudo shadow by using the above-described orientation information. For example, it may also be possible to project a shadow in accordance with the simplified shape of a performer onto the bottom surface of the human-shaped screen described previously, which is obtained from the orientation information on the performer. Due to this, it is possible to represent a pseudo shadow in accordance with the movement of the performer or the like. Further, it may also be possible to separately obtain the position and shape data of the portion close to the floor surface (for example, the area 30 cm above the floor surface) of the three-dimensional shape represented by the foreground model, which is the estimation results, and draw a pseudo shadow by using this. With this method, even from the simplified shape data, such as the bounding box with which it is not possible to grasp the silhouette of the actual foreground object, it is possible to generate a pseudo shadow 1301 only in the vicinity of the foot of the performer, for example, as in a composite image 1300 shown in FIG. 13. Further, in a case of this method, it is not necessary to detect the orientation of the foreground object, and therefore, there is also an advantage that the amount of processing is small.

According to the present embodiment, it is possible to easily obtain a natural composite image in which a 2D image representing an appearance from a virtual camera viewpoint not limited by the actual camera position and a background created by CG are in harmony with each other. Further, the material data at the time of generating a virtual viewpoint image is utilized also for composition, and therefore, the efficiency is high. Furthermore, it is possible to establish synchronization between data and improve the accuracy of obtaining the three-dimensional position of the foreground object more easily, and therefore, high-quality composition is enabled.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (MD), or Blu-ray Disc (BD)™), a flash memory device, a memory card, and the like.

According to the technique of the present disclosure, it is possible to obtain a natural composite image in which a foreground object included in a two-dimensional image and a background object included in a three-dimensional computer graphics space are in harmony with each other.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-139991, filed Aug. 30, 2021 which is hereby incorporated by reference wherein in its entirety.

What is claimed is:

1. An image processing apparatus comprising:

one or more memories that store instructions; and one or more processors that execute the instructions to perform:

obtaining a two-dimensional image, corresponding to a specific viewpoint and including a foreground object, a parameter specifying a condition at the time of obtaining the two-dimensional image, and position and shape data representing a three-dimensional position and a shape of the foreground object included in the two-dimensional image; and generating an image including the foreground object and a background object by arranging a screen based on the position and shape data in a computer graphics space including the background object, and by projecting the image of the foreground object included in the two-dimensional image onto the screen based on the parameter, wherein the screen is a three-dimensional shape and a transparent bounding box.

2. The image processing apparatus according to claim 1, wherein the position and shape data is data describing a three-dimensional position of each vertex of a rectangular parallelepiped circumscribing the foreground object and a length of each side of the rectangular parallelepiped.

3. The image processing apparatus according to claim 1, wherein in the generating an image, by forming a pseudo shadow of the foreground object based on the position and shape data in a three-dimensional space of the computer graphics, an image including the foreground object and the background object is generated.

4. The image processing apparatus according to claim 3, wherein the pseudo shadow is a translucent black or gray ellipse.

5. The image processing apparatus according to claim 1, wherein the two-dimensional image corresponding to the specific viewpoint is a frame constituting a moving image and the one or more processors further execute the instructions to perform generating position and shape data synchronized with each frame of the moving image in a case where an obtaining period of the position and shape data and an obtaining period of a frame constituting the moving image are different.

6. The image processing apparatus according to claim 1, wherein the two-dimensional image corresponding to the specific viewpoint is a captured image obtained by an imaging device and the parameter is an image capturing parameter representing a condition at the time of capturing the object by the imaging device.

7. The image processing apparatus according to claim 6, wherein the image of the foreground object is an image obtained by performing chroma key processing for the captured image.

8. The image processing apparatus according to claim 1, wherein the two-dimensional image corresponding to the specific viewpoint is a virtual viewpoint image generated based on a plurality of captured images obtained by capturing the object from a plurality of viewpoints by an imaging device and representing an appearance from a virtual viewpoint different from the plurality of viewpoints and the parameter is a virtual viewpoint parameter representing a condition at the time of generating the virtual viewpoint image.

9. The image processing apparatus according to claim 8, wherein in the obtaining, position and shape data of the object is obtained based on data representing a three-dimensional shape of the object generated by using the plurality of captured images.

10. An image processing apparatus comprising:

one or more memories that store instructions; and one or more processors that execute the instructions to perform:

obtaining a two-dimensional image corresponding to a specific viewpoint and including a foreground object, a parameter specifying a condition at the time of obtaining the two-dimensional image, and position and shape data representing a three-dimensional position and a shape of the foreground object included in the two-dimensional image; and generating an image including the foreground object and a background object by arranging a screen based on the position and shape data in a computer graphics space including the background object, and by projecting the image of the foreground object included in the two-dimensional image onto the screen based on the parameter, wherein in the generating an image, by rendering that determines a color of each pixel based on a distance from a viewpoint that is set based on the parameter to each foreground object, an image including the foreground object and the background object is generated.

11. The image processing apparatus according to claim 10, wherein in the generating an image:

a condition at the time of performing the projection is set in accordance with a condition at the time of obtaining the two-dimensional image, which is specified by the parameter.

12. The image processing apparatus according to claim 10, wherein the two-dimensional image corresponding to the specific viewpoint is a frame constituting a moving image, and in the obtaining, the position and shape data is obtained at timing synchronized with a fame constituting the moving image.

13. The image processing apparatus according to claim 10, wherein the two-dimensional image corresponding to the specific viewpoint is a virtual viewpoint image generated based on a plurality of captured images obtained by capturing the object from a plurality of viewpoints by an imaging device and representing an appearance from a virtual viewpoint different from the plurality of viewpoints, and the parameter is a virtual viewpoint parameter representing a condition at the time of generating the virtual viewpoint image.

14. The image processing apparatus according to claim 13, wherein in the obtaining, position and shape data of the object is obtained based on data representing a three-dimensional shape of the object generated by using the plurality of captured images.

15. An image processing method comprising:

obtaining a two-dimensional image, corresponding to a specific viewpoint and including a foreground object, a parameter specifying a condition at the time of obtaining the two-dimensional image, and position and shape data representing a three-dimensional position and a shape of the foreground object included in the two-dimensional image; and generating an image including the foreground object and a background object by arranging a screen based on the position and shape data in a computer graphics space including the background object, and by projecting the image of the foreground object included in the two-dimensional image onto the screen based on the parameter, wherein the screen is a three-dimensional shape and a transparent bounding box.

16. A non-transitory computer readable storage medium storing a program for causing a computer to perform an image processing method comprising:

obtaining a two-dimensional image, corresponding to a specific viewpoint and including a foreground object, a parameter specifying a condition at the time of obtaining the two-dimensional image, and position and shape data representing a three-dimensional position and a shape of the foreground object included in the two-dimensional image; and generating an image including the foreground object and a background object by arranging a screen based on the position and shape data in a computer graphics space including the background object, and by projecting the image of the foreground object included in the two-dimensional image onto the screen based on the parameter, wherein the screen is a three-dimensional shape and a transparent bounding box.

17. An image processing method comprising:

obtaining a two-dimensional image corresponding to a specific viewpoint and including a foreground object, a parameter specifying a condition at the time of obtaining the two-dimensional image, and position and shape data representing a three-dimensional position and a shape of the foreground object included in the two-dimensional image; and generating an image including the foreground object and a background object by arranging a screen based on the position and shape data in a computer graphics space including the background object, and by projecting the image of the foreground object included in the two-dimensional image onto the screen based on the parameter, wherein in the generating an image, by rendering that determines a color of each pixel based on a distance from a viewpoint that is set based on the parameter to each foreground object, an image including the foreground object and the background object is generated.

18. A non-transitory computer readable storage medium storing a program for causing a computer to perform an image processing method comprising:

obtaining a two-dimensional image corresponding to a specific viewpoint and including a foreground object, a parameter specifying a condition at the time of obtaining the two-dimensional image, and position and shape data representing a three-dimensional position and a shape of the foreground object included in the two-dimensional image; and generating an image including the foreground object and a background object by arranging a screen based on the position and shape data in a computer graphics space including the background object, and by projecting the image of the foreground object included in the two-dimensional image onto the screen based on the parameter, wherein in the generating an image, by rendering that determines a color of each pixel based on a distance from a viewpoint that is set based on the parameter to each foreground object, an image including the foreground object and the background object is generated.

* * * * *